(12) United States Patent
Unger (10) Patent No.: US 11,392,809 B2
(45) Date of Patent: Jul. 19, 2022

(54) FOLLOWER CIRCUITS FOR COMMUNICATION

(71) Applicant: HEWLETT-PACKARD DEVELOPMENT COMPANY, L.P., Spring, TX (US)

(72) Inventor: Quinn Unger, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 16/956,354

(22) PCT Filed: Jan. 18, 2019

(86) PCT No.: PCT/US2019/014279
§ 371 (c)(1),
(2) Date: Jun. 19, 2020

(87) PCT Pub. No.: WO2020/149855
PCT Pub. Date: Jul. 23, 2020

(65) Prior Publication Data
US 2021/0216836 A1   Jul. 15, 2021

(51) Int. Cl.
*G06K 15/00* (2006.01)
*G06F 21/44* (2013.01)

(52) U.S. Cl.
CPC ........... *G06K 15/407* (2013.01); *G06F 21/44* (2013.01)

(58) Field of Classification Search
CPC .............................. G06K 15/407; G06F 21/44
See application file for complete search history.

(56) References Cited

U.S. PATENT DOCUMENTS

| | | | |
|---|---|---|---|
| 5,903,607 A | 5/1999 | Tailliet | |
| 7,650,450 B2 | 1/2010 | Soriano et al. | |
| 8,161,224 B2 | 4/2012 | Laurencin et al. | |
| 8,509,318 B2 | 8/2013 | Tailliet | |
| 8,874,816 B2 | 10/2014 | Tailliet | |
| 9,479,279 B2 | 10/2016 | Gilbert et al. | |
| 9,639,500 B2 | 5/2017 | Bas et al. | |
| 10,075,157 B1 * | 9/2018 | Den Hartog ... | H03K 19/017509 |

(Continued)

FOREIGN PATENT DOCUMENTS

| | | |
|---|---|---|
| CN | 2746666 Y | 12/2005 |
| EP | 2725427 B1 | 8/2016 |
| WO | WO-WO2009142632 A1 | 11/2009 |

OTHER PUBLICATIONS

Rev: "I2C-bus specification and user manual", Apr. 4, 2014 (Apr. 4, 2014), XP055624977, Retrieved from the Internet: URL:http://www.nxp.com/documents/user_manual/UM10204.pdf.

*Primary Examiner* — Juan M Guillermety
(74) *Attorney, Agent, or Firm* — Dicke, Billig & Czaja, PLLC (57) ABSTRACT

A follower circuit includes a communication circuit coupled to a data pad and an authentication circuit to conduct a communication session. The communication circuit detects a stepped voltage signal having a plurality of successive voltage levels of three voltage levels on the data pad to initiate a data frame of the communication session and provides a voltage signal to the data pad to request the communication session. The authentication circuit coupled to the communication circuit identifies a parameter in the data frame.

16 Claims, 3 Drawing Sheets

---

STEP VOLTAGE SIGNAL WITH VOLTAGE LEVELS TO INDICATE START CONDITION
302

HOLD VOLTAGE SIGNAL AT VOLTAGE LEVEL TO INDICATE STOP CONDITION
304

STEP VOLTAGE SIGNAL WITH A VOLTAGE LEVELS TO INDICATE RESET CONDITION
306

300

(56) References Cited

U.S. PATENT DOCUMENTS

| | | | |
|---|---|---|---|
| 2005/0220232 A1* | 10/2005 | Kunnari | H04L 25/4923 |
| | | | 375/353 |
| 2008/0031167 A1* | 2/2008 | Chen | H04L 5/04 |
| | | | 370/298 |
| 2010/0017553 A1 | 1/2010 | Laurencin | |
| 2011/0029705 A1* | 2/2011 | Evans | G06F 13/4291 |
| | | | 710/110 |
| 2012/0158194 A1* | 6/2012 | Schwarz | G05B 19/0425 |
| | | | 700/286 |
| 2018/0260357 A1* | 9/2018 | Amon | G06F 13/4291 |

* cited by examiner

Fig. 4

FOLLOWER CIRCUITS FOR COMMUNICATION

CROSS-REFERENCE TO RELATED APPLICATIONS

This application is a U.S. National Stage Application of PCT Application No. PCT/US2019/014279, filed Jan. 18, 2019, entitled "FOLLOWER CIRCUITS".

BACKGROUND

Printing devices can include printers, copiers, fax machines, multifunction devices including additional scanning, copying, and finishing functions, all-in-one devices, or other devices such as pad printers to print images on three dimensional objects and three-dimensional printers (additive manufacturing devices). In some examples, printing devices can receive digital files for printing images or three-dimensional items. Printing devices apply a print substance, often in a subtractive color space or black, to a medium via a device component such as a printhead. The medium can include various types of print media, such as plain paper, photo paper, polymeric substrates and can include any suitable object or materials to which a print substance from a printing device are applied including materials, such as powdered build materials, for forming three-dimensional articles. Print substances, such as printing agents, marking agents, and colorants, can include toner, liquid inks, or other suitable marking material that in some examples may be mixed with other print substances such as fusing agents, detailing agents, or other materials and can be applied to the medium.

DETAILED DESCRIPTION

Printing devices can include consumable supply components that may be periodically added to, replaced, or exchanged on the printing devices. Examples of supply components can include elements of a print engine such as a printhead, drum, developer, and fuser. Print substance supplies or cartridges, which may include a relatively limited life span compared to elements of a print engine, may also be selectively replaced when empty or when a user desires a different formulation are also examples of supply components. Each of these supply components include features or parameters that can affect the performance of the printing device including printing or application of a controller in the printing device. In some examples the supply components or containers that include the supply components may include circuits or memory devices to store data that is configured to communicate with a controller in the printing device to provide information or exchange information regarding the supply component via a communication system.

An example communication system that can be used between a controller in a printing device and circuits on a supply component is Inter-Integrated Circuit, which is commonly referred to as I²C or I2C. I2C is commonly used in exchanging information between relatively lower-speed peripheral integrated circuits, such as circuits on the supply components, and controllers on the printing device for relatively short distance, intra-device communication. I2C is apt for peripherals that prioritize low manufacturing costs over speed of communications. In an I2C configuration, a leader node, or leader circuit, such as a controller on the printing device, communicatively connects to a follower node, or follower circuit, on a supply component, such as integrated circuits or memory devices on print substance containers for each of the cyan, yellow, magenta, and black print substances, via conductive lines. I2C uses four conductive lines to connect a leader circuit to a follower circuit: a power supply line, such as a supply voltage or $V_{DD}$, a common reference line such as GND, and two bidirectional open collector or open drain communication lines consisting of a serial data line (SDA) and a serial clock line (SCL) through which all communications occur. Clock and data are provided on the separate lines, which requires separate bonding pads on the follower circuit in a supply component, which includes corresponding material costs and increases area or decreases usable area for logic elements on the follower circuit. Two wire communication systems, in which data and power are supplied via the same line, however, do not supply enough power to operate follower circuits on typical supply components.

This disclosure describes a communication system that includes a leader circuit and a follower circuit. In one example, the leader circuit can be implement with controller, or processing device, of a printing device, or included as a communication circuit operably coupled to the controller of the printing device. The follower circuit can be attached to or included on a supply component for use with the printing device. In one example, the supply component may be installed in the printing device, such as a print substance cartridge. In another example, the supply component may be temporarily attached to the printing device such as a print substance container that may be used to refill a print substance reservoir on the printing device with print substance. The follower circuit may include an integrated circuit, such as an application-specific integrated circuit, or a memory device storing data. To implement the communication system, the follower circuit is communicatively coupled to the leader circuit, which can include removably coupling the follower circuit to the leader circuit, via three conductive lines including a power conductor, such as a $V_{DD}$, a reference conductor, such as GND, and a single data conductor. Communication is exchanged between the leader circuit and the follower circuit via the data conductor.

Figure 1:
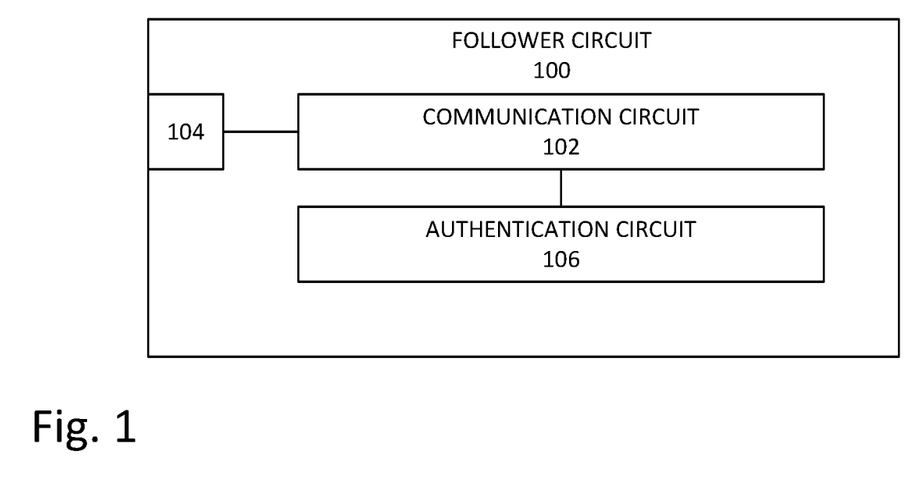
FIG. 1 is a block diagram illustrating an example follower circuit.

FIG. 1 illustrates an example follower circuit 100 that may be implemented in a communication system having a leader circuit. The follower circuit 100 includes a communication circuit 102 operably coupled to a single data pad 104. The data pad 104 is configured to be electrically coupled to the data conductor in the communication system and communicatively coupled to the leader circuit. The data pad 104 can be implemented as an electrical connection, such as a conductive contact pad or pin on an integrated circuit, that interfaces with the data conductor. In one example, the data pad 104 can be electrically coupled to a conductive pad that is included on the supply component to interface with the communication system. The communication circuit 102 provides and receives electrical signals, such as electrical signals of a selected voltage level, via the data pad 104 to communicate with a leader circuit. The follower circuit 100 also includes an authentication circuit 106 operably coupled to the communication circuit 102. The communication circuit 102 is configured to detect a stepped voltage signal having a plurality of successive voltage levels of three voltage levels on the data pad to initiate a data frame of the communication session. In one example, the plurality of successive voltage levels in the voltage signal includes three successive voltage levels. In some examples, the three voltage levels can include more than three voltage levels. The communication circuit 102 provides a voltage signal to the data pad 104 from a high impedance state to request the communication session. The authentication circuit 106 operably coupled to the communication circuit 102 can store information related to a parameter, such as a parameter of a supply component coupled to the follower circuit 100, and identifies the parameter in the data frame. In one example, the parameter includes an authentication code that is communicated to the leader circuit in the data frame. In another example, the leader circuit can modify the parameter of the authentication circuit 106 in the data frame via the communication circuit 102.

Figure 2:
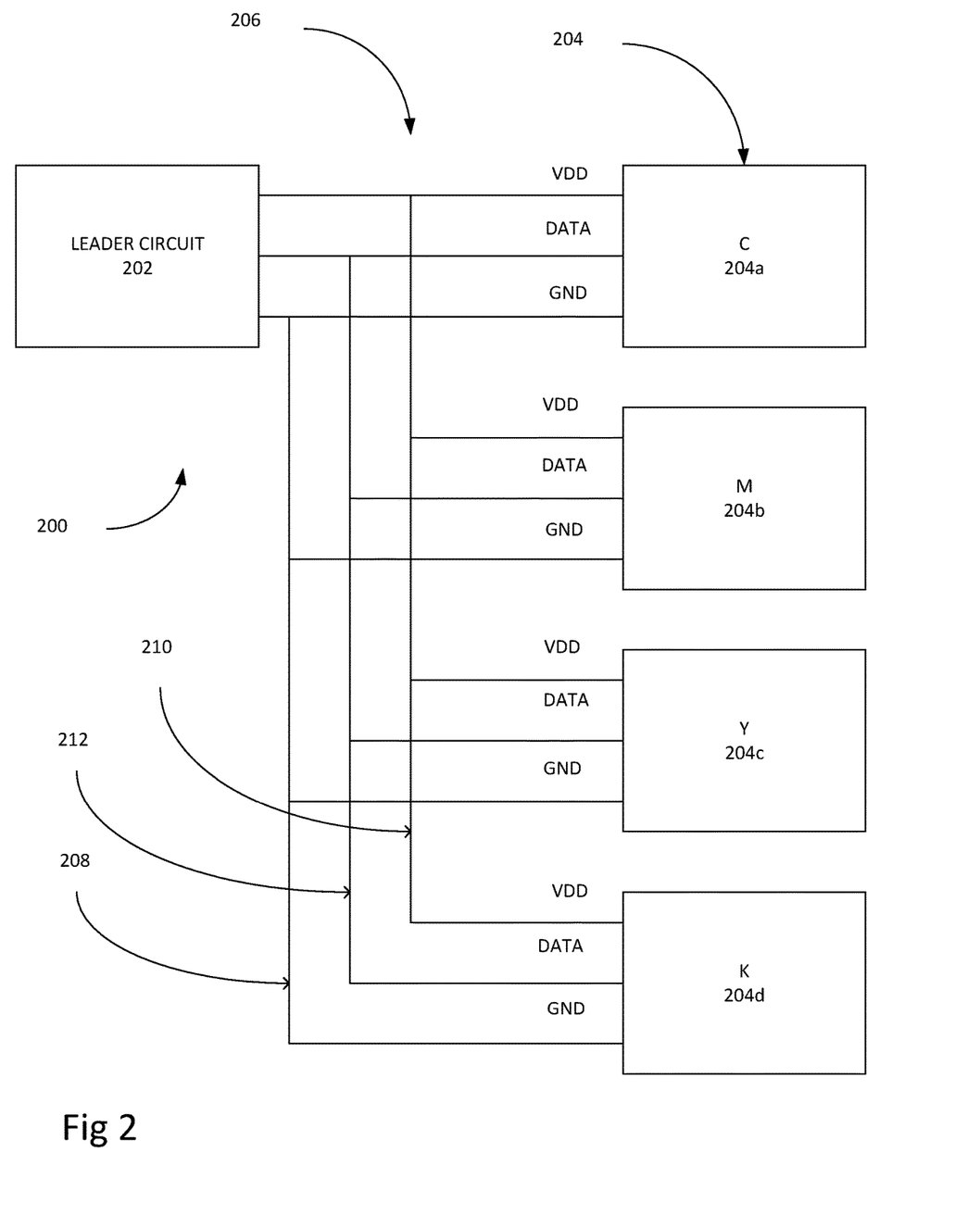
FIG. 2 is a block diagram illustrating an example communication system including a leader circuit communicatively coupled to a follower circuit of FIG. 1.

FIG. 2 illustrates an example communication system 200 that can incorporate the follower circuit 100. The communication system 200 includes a leader circuit 202 communicatively coupled to a follower circuit 204, such as a plurality of follower circuits, 204a, 204b, 204c, 204d. The follower circuits 204a, 204b, 204c, 204d can be constructed in accordance with the follower circuit 100 and include a communication circuit 102, a data pad 104, and, in the example, an authentication circuit 106. In one example, the leader circuit 202 is configured in a controller of a printing device, such as a communication element operably coupled to a processing device on the printing device. In the example, the follower circuits 204a, 204b, 204c, 204d, are operably coupled to a supply component, such as container having a print substance or a print substance cartridge, in which the authentication circuit includes a parameter of the print substance included in the container. In one example, the parameter can identify the print substance or print substance formulation, and in another example the parameter can be modified via communication with the leader circuit, such as an amount of print substance remaining in the container. In the illustrated example, follower circuit 204a can correspond with a print substance container containing a cyan print substance C, follower circuit 204b can correspond with a print substance container containing a magenta print substance M, follower circuit 204c can correspond with a print substance container containing a yellow print substance Y, and follower circuit 204d can correspond with a print substance container containing a black, or key, print substance K.

The follower circuits 204a, 204b, 204c, 204d are electrically coupled to the leader circuit 202 via a bus 206 having a power conductor 208 to receive a power signal, such as a $V_{DD}$, a reference conductor 210 for a reference signal, such as GND, and a single data conductor 212 on which the follower circuits 204a, 204b, 204c, 204d and leader circuit communicate. In the example, the conductors 208, 210, 212 can be configured from wires or traces formed from an electrically conductive material. The follower circuits 204a, 204b, 204c, 204d includes pins or contacts that be coupled, such as removably coupled, to the conductors 208, 210, 212.

For example, the follower circuit 204 can include a data pad, which can correspond with data pad 106 of follower circuit 100, to electrically couple the follower circuit 204 to the data conductor 212. In the illustrated example, the leader circuit 202 is configured to provide the power signal, such as $V_{DD}$ on power conductor 208 and the reference signal, such as a reference voltage GND, on reference conductor 210.

In the example, the leader circuit 202 and follower circuit 204 include states or capabilities for asserting an output on the data conductor 212. The leader circuit 202 can pull the data conductor 212 to one of three signal levels such as voltage levels. In the example of three voltage levels, the voltage levels can be high impedance, pullup voltages that include a high voltage level (High), such as $V_{DD}$, a medium voltage level (Medium), which can be approximately half of $V_{DD}$, and a low voltage level (Low), such as GND or zero volts. The follower circuit 204 can pull the data conductor 212 to the low voltage level (Low) and can output a high impedance state (Hi-Z) in which the data pad floats as an open connection. Hi-Z can be a default state for the follower circuit 204 when not communicating with the leader circuit 202. (In one example, the leader circuit 202 can also output Hi-Z.) If the follower circuit 204 asserts Low, any High or Medium signal on the data conductor 212 can be dragged to Low.

Figure 3:
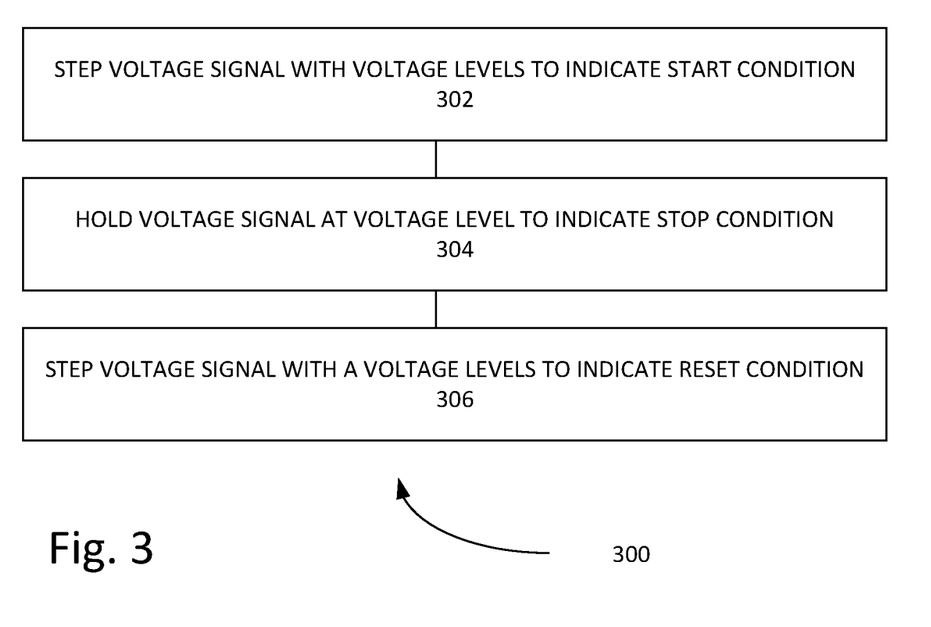
FIG. 3 is a block diagram illustrating an example method for use with the leader circuit of the communication system of FIG. 2.

FIG. 3 illustrates an example method 300 with which the leader circuit 202 can use to interact with the follower circuit 204. The method 300 can be implemented using voltage signals comprising the three voltage levels (High, Medium, Low) asserted on the data conductor 212. The leader circuit 202 and follower circuit 204 can interact via codes that can include a combination of a voltage signal selected from the three voltage levels or Hi-Z and a selected amount of time the voltage signal or Hi-Z is asserted. The selected amount of time can be measured in terms of clock periods or clock cycles. The leader circuit 202 can control timing of the clock cycles using the data conductor 212. The single data conductor 212 is implemented to communicate data and clock information. In one example, a clock cycle includes a rising edge and a falling edge of a voltage signal, which can be detected by the follower circuit 204. Voltage signals communicating data can also include a rising edge and a falling edge that can be detected by the leader circuit 202 and the follower circuit 204.

The communication system 200 can be idle or in a communication session. A communication session can include a data frame, such as a plurality of data frames. While the communication system 200 is idle or in circumstance in which no communication transactions are in progress, the leader circuit 202 can assert a voltage level, such as a continuous High, to indicate a ready condition, or READY. The default state for the follower circuit 204 can be Hi-Z while idle. The data conductor 212 can carry the voltage signal at High from the leader circuit 202. From READY, the leader circuit 202 and the follower circuit 204 can interact with each other to establish a communication session. In the example, the leader circuit 202 and the follower circuit 204 can exchange data in a data frame of the communication session on data conductor 212.

To initiate a data frame in a communication session, the leader circuit 202 can step a voltage signal on the data conductor 212 with a first pattern of a plurality of successive voltage levels selected from the three voltage levels (High, Medium, Low) at 302 to indicate a start condition, or START. The voltage levels of the voltage signal are successive in time in which one voltage level follows another voltage level. For example, the first pattern of a plurality of voltage levels can include three successive voltage levels. In one example, of the voltage signal can be stepped, or changed over a period of time to indicate the pattern, such as from High to Medium to Low to initiate the data frame of the communication session. In this example, the pattern of High to Medium to Low transitions the communication system 200 from READY to START. In one example at 302, the leader circuit 202 indicates READY with a voltage signal on the data conductor 212 at a continuous High, and the follower circuits 204a, 204b, 204c, 204d receive the continuous High while in the Hi-Z state. The leader circuit 202 then can initiate a data frame in a communication session with a voltage signal on the data conductor 212 that is stepped with three voltage levels in the first pattern over a period of time from READY, such as stepped in a pattern from High to Medium to Low, which the follower circuit 204 receives, to indicate START and initiate a data frame in a communication session at 302.

The data frame can begin with a header having an opcode. In some examples, the header can also include supplemental information including an address, such as an address of a follower circuit 204a, 204b, 204c, 204d, depending on the opcode. The header can be used to establish synchronization between the leader circuit 202 and the follower circuit 204. In one example, each opcode includes four bits, which permits up to sixteen communication modes and broadcast commands. In one example, a leader circuit can address the follower circuit 204a, 204b, 204c, 204d via binary addressing or mask addressing. Binary addressing uses multiple bits to represent a single device. In one example, follower circuit 204 can acknowledge a binary address with a logic value, such as logic 1, on the final address bit. Mask addressing permits multiple follower circuits 204a, 204b, 204c, 204d to be addressed in the same data frame, which can be useful for multicast commands or in circumstances in which the leader circuit 202 interacts with more than one follower circuit 204a, 204b, 204c, 204d simultaneously. Mask addressing can allocate a bit to each device in the address range. The leader circuit sends a first logic signal, such as logic 1, for each follower circuit to be addressed and a second logic signal, such as logic 0, for each follower circuit not to be addressed. In one example, follower circuit 204 can acknowledge a binary address with a logic value, such as logic 1, on the associated address bit.

A data frame can include a data frame body, which may follow the header. During the data frame body, communication may be exchanged between the leader circuit 202 and the follower circuit 204 according to the header. A follower circuit 204 that is not addressed can ignore the communication until another data frame is created whether that data frame is included in the communication session or in a subsequent communication session. The leader circuit 202 may send data to the follower circuit 204 in a portion of the data frame, the follower circuit 204 may send data to the leader circuit 202 in a portion of the data frame, and the leader circuit 202 and follower circuit 204 may exchange data in a duplex mode. The follower circuit 204 may send data to the leader circuit 202 while the leader circuit 202 sends a stream of logic signals that operates as a clock signal. The follower circuit 204 can ignore the data sent in the stream of logic signals. In a duplex mode, the leader circuit 202 sends data that can also operate as a clock signal, but the follower circuit 204 samples and holds the data rather than ignores the data.

At the conclusion of the data frame, the leader circuit 202 can hold a voltage signal on the data conductor 212 at a selected first voltage level of the three voltage levels for longer than a selected time period at 304 to indicate a stop condition, or STOP, and end the data frame in the communication session. For example, the first voltage level can be Low, and the leader circuit 202 can end a data frame, or indicate STOP, with a Low for longer than one clock cycle, such as at least three clock cycles. During the data frame, the leader circuit can communicate data via bits of logic 0 and logic 1 using the other two voltage levels, e.g., a second voltage level and third voltage level, of the three voltage levels. A voltage signal at the second and third voltage levels can correspond with logical bits in the data frame. For instance, if Low is used to indicate STOP and end the data frame, the leader circuit 202 can communicate logic 1 and logic 0 via High and Medium, respectively. In one example at 304, once the leader circuit 202 has finished sending data bits corresponding with logic 1 and logic 0 using High and Medium, respectively, the leader circuit 202 can assert Low on the data conductor 212 for longer than one clock cycle, which the follower circuit 204 receives, to indicate STOP, or the end of the data frame. In the example, the follower circuit 204 enters the Hi-Z state.

To remain in a communication session after the end of the data frame at 304, the leader circuit can indicate a repeated start condition, or REP. The leader circuit 202 can hold a voltage signal on the data conductor 212 at the selected voltage level of the three voltage levels used to indicate READY, such as High, to continue the communication session after indicating STOP. To resume the communication session, such as to start another data frame in the communication, the leader circuit 202 can step a voltage signal on the data conductor 212 with a first set of plurality of successive voltage levels of three voltage levels (High, Medium, Low) at 302 to indicate START. In one example, the leader circuit 202 steps a voltage signal from Low (indicating STOP) to High (indicating REP) on the data conductor, which the follower circuit 204 receives, to remain in the communication session.

In one example, the follower circuit 202 may use REP to communicate with a plurality of the follower circuits 204a, 204b, 204c, 204d in one communication session. For example, the follower circuit 202 can communicate with one of the follower circuits 204a, 204b, 204c, 204d with a first data frame in the communication session, then STOP to end the first data frame, and then REP to communicate with another of the follower circuits 204a, 204b, 204c, 204d with a second data frame in the communication session, then STOP to end the second data frame, and then REP to communicate with still another of the follower circuits 204a, 204b, 204c, 204d with a third data frame in the communication session or RST to end the communication session and return to READY.

To end the communication session, the leader circuit 202 can step a voltage signal on the data conductor 212 with a second pattern of a plurality of successive voltage levels of the three voltage levels (High, Medium, Low) at 306 to indicate a reset condition, or RST. The second pattern of the plurality of successive voltage levels is different than the first pattern of the plurality of voltage levels. If the voltage signal of the first pattern of stepped voltage levels is High to Medium to Low to indicate START, the second pattern of stepped voltage levels can be Low to Medium to High to indicate RST and end the communication as well as return to indicate an idle state, such as READY. In this example, the communication session is ended at 306 after the end of the data frame at 304. In one example at 306, the leader circuit 202 indicates STOP with a voltage signal on the data conductor 212 at a Low for longer than one clock cycle. The follower circuits 204a, 204b, 204c, 204d receive the Low and enter or remain in the Hi-Z state. The leader circuit 202 then can end the communication session with a voltage signal that is stepped with a plurality of voltage levels in the second pattern over a period of time from STOP, such as stepped in a pattern from Low to Medium to High on the data conductor 212, which the follower circuit receives, to indicate RST at 306.

Figure 4:
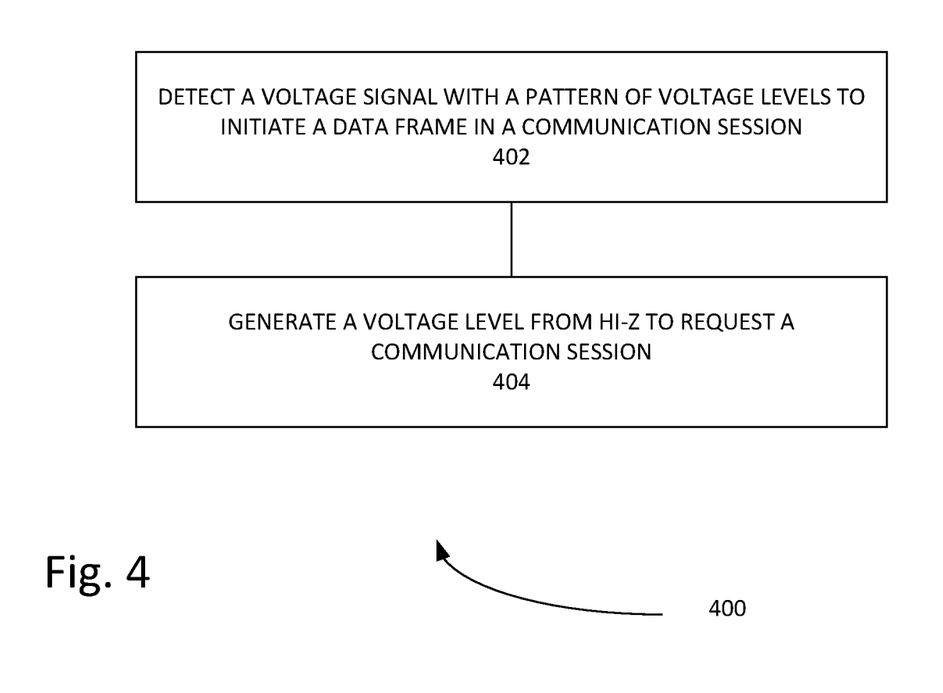
FIG. 4 is a block diagram illustrating an example method for use with the follower circuits of FIG. 1 and FIG. 2

FIG. 4 illustrates an example method 400 with which the follower circuit 100, 204 can use to interact with the leader circuit 202. The method 400 can be implemented by receiving voltage signals comprising the three voltage levels (High, Medium, Low) asserted on the data conductor 212 from the leader circuit 202 and by asserting a voltage signal of a voltage level on the data conductor 212 or the Hi-Z state on the data pad from the follower circuit 204.

The follower circuit 204 detects a stepped voltage signal having a pattern of a plurality of successive voltage levels of three voltage levels on a data conductor with a follower circuit to initiate a data frame of a communication session at 402. In one example, the follower circuit 100, 204 receives a voltage signal that is stepped with a plurality of voltage levels over a period of time from READY, such as stepped from High to Medium to Low. In the example of follower circuit 100, the voltage signal is received at the data pad 106 and is detected with the communication circuit 102. From Low, the leader circuit 202 will send a Medium or High, and the follower circuit 100, 204, can detect the rising edge of the data signal for synchronization of internal timers, such as timers in the communication circuit 102, with the leader circuit 202. In one example, the follower circuit resynchronizes internal timers with the leader circuit 202 following each rising edge from the leader circuit 202 while the follower circuit 204 is in the Hi-Z state.

The follower circuit 100, 204 detects two of the three voltage levels as a data bit in data frame on the data conductor 212 at the data pad, and detects a selected voltage level of the three voltage levels at the data pad to indicate an end of the data frame. In the example, the follower circuit 100, 204 can sample and hold High and Medium in the communication circuit 102, as logic 1 and logic 0, respectively, and may store the bits. The follower circuit 204 can sample and hold in response to a rising edge in a data signal. The follower circuit 100, 204 can also detect a voltage signal with Low held for longer than a clock cycle as a STOP. In some examples, the follower circuit 100, 204 can abort a data frame and initiate a STOP. For example, the follower circuit 100, 204 may provide a voltage signal with a Low for more than a clock period, in which case the leader circuit 202 may behave as if the leader circuit 202 has initiated the STOP.

During a STOP, the follower circuit 100, 204 can also assert a Low on the data conductor 212 to indicate a wait condition, or WAIT, which can cause the leader circuit 202 to delay a subsequent data frame or the end of the communication session until the follower circuit 100, 204 is prepared. In one example, the leader circuit can assert Low on the data conductor 212 for several clock cycles during STOP to allow the follower circuit 100, 204 to respond with a WAIT. In one example, the communication system 200 can remain in STOP as long as a follower circuit 204 is in WAIT. When the follower circuit 204 is ready to exit WAIT, the follower circuit 204 transitions to a Hi-Z state, which is detected by the leader circuit 202 as a rising edge of a signal, and the leader circuit can continue STOP or enter REP or RST.

In some instances, the follower circuit 100, 204 would prefer to begin a communication session, such as while the communication system 200 is READY, and not wait for the leader circuit 202 to initiate a data frame in the communication session. In this instance, the follower circuit 100, 204 can provide a voltage signal from the HI-Z state on the data pad to request a communication session at 404. While READY, the leader circuit 202 asserts a continuous High on the data conductor 212 and the follower circuit 100, 204 is at a Hi-Z state at the data pad. From the Hi-Z state, the follower circuit 100, 204, asserts a request voltage signal at a voltage level, such as Low, for a selected period of time, such as a selected number of clock cycles, to request a communication session with the leader circuit 202 and initiate a request condition, or REQ. In some examples, a plurality of follower circuits 204a, 204b, 204c, 204d may prefer to begin a communication session with the leader circuit 202 while the leader circuit 202 is in READY. The leader circuit 202 can detect the Low from a follower circuit 204 on the data conductor and decide whether to initiate a data frame in a communication session. If a plurality of the follower circuits 204a, 204b, 204c, 204d send request signals, the leader circuit 202 can ignore subsequent request signals. Follower circuits 204a, 204b, 204c, 204d can be configure to not send request signals after a Low to High rising edge is detected on the data conductor 212 and prior to RST. Additionally, the follower circuits 204a, 204b, 204c, 204d can be configure to not send request signals if it detects a falling edge on the data conductors 212, which may result from another follower circuit 204a, 204b, 204c, 204d sending a request signal or from the leader circuit 202 sending a pattern of START. In the latter case, the leader circuit 202 can abort the START, ignore the request signal, return to READY, and then resume START. The leader circuit 202 can service the attempted request signal in a subsequent communication session.

The leader circuit 202 can service the REQ by opening a data frame in a communication session. For instance, in response to detecting a REQ, the leader circuit 202 can initiate START from READY. The header of the data frame may include a request poll opcode, REQ_POLL, followed by the leader circuit 202 mask addressing the follower circuits 204a, 204b, 204c, 204d. Follower circuits 204a, 204b, 204c, 204d that wish to engage with the leader circuit may respond with an acknowledgement signal, ACK, on the data conductor 212 such as Low for the corresponding address bit. In one example, the leader circuit 202 can store the address of the follower circuit that responded with an ACK, indicate a REP, and begin a new data frame with a request serve opcode and address of a follower circuit 204 that responded with the ACK. In response to a request serve opcode, the corresponding follower circuit 204 may issue a follower opcode that defines further communication in the data frame.

The follower circuit 100, 204 can send data on the data conductor 212 to the leader circuit 202 during a data frame via a set of logic signals indicating logic 1 and logic 0. The follower circuit 100, 204 can send the data in response to the leader circuit 202 providing a clock signal on the data conductor 212. In one example, the leader circuit 202 sends a stream of logic signals, such as a stream of Mediums or Highs to correspond with logic 0 and logic 1 on the data conductor 212, that operates as a clock signal. The follower circuit 204 can ignore the data sent in the stream of logic signals. The follower circuit 204 can send a first logic signal, such as logic 0, per clock period by not interacting with the clock signal with a Hi-Z. The follower circuit 204 can send a second logic signal, such as a logic 1, with a Low for a clock period after sensing a rising edge in the clock signal. When the follower circuit 204 asserts a Low as a logic signal, the leader circuit 202 can detect the falling edge of the logic signal and store the bit. In this example, the follower circuit 204 returns to Hi-Z after a clock period at Low in order to not cause the data frame to abort. In a duplex mode, the leader circuit 202 sends data in the form of logic signals that can also operate as a clock signal, but the follower circuit 204 samples and holds the logic signals from the leader circuit 202 rather than ignores the data. In this example, once the leader circuit 202 detects a falling edge of the Low from the follower circuit 204, the leader circuit 202 prepares to send a bit in the form of a logic signal to the follower circuit 204. The follower circuit 204 is able to receive the bit in the form of the logic signal from the leader circuit 202 upon the follower circuit 204 return to Hi-Z.

In one example, the leader circuit 202 and follower circuit 204 are implemented with application-specific integrated circuits having an output pins coupled to the bus 206 including an output pin coupled to a power conductor 208, an output pin coupled to a reference conductor 210 and an output pin or data pad coupled to a single data conductor 212 In some examples, portions of the circuits 202, 204 may be implemented via programming. Programming can be implemented as a set of processor-executable instructions stored on a non-transitory computer readable medium such as memory that can cause a processing device to execute a method according to the instructions. Computer readable media, computer storage media, or memory may be implemented to include a volatile computer storage media, non-volatile computer storage media, or as any suitable method or technology for storage of information such as computer readable instructions, data structures, program modules or other data. A propagating signal by itself does not qualify as storage media or a memory device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A follower circuit, comprising:
    a communication circuit coupled to a single data pad to conduct a communication session with the data pad over a serial interface, the communication circuit of no more than three conductors including the data pad, a reference pad, and a power pad,
    wherein the communication circuit is configured to detect a stepped voltage signal having a plurality of successive voltage levels of three voltage levels on the data pad to initiate a data frame of the communication session and control timing of a clock, and provide a voltage signal to the data pad to request the communication session, the voltage signal provided in response to a clock signal received on the data pad during the communication session; and
    an authentication circuit coupled to the communication circuit to identify a parameter in the data frame.

2. The follower circuit of claim 1 wherein the parameter relates to a printing device supply component.

3. The follower circuit of claim 2 wherein the parameter relates to a print substance.

4. The follower circuit of claim 1 operably coupled to a printing device supply component.

5. The follower circuit of claim 4 wherein the printing device supply component is a print substance cartridge.

6. A method of transmitting digital data, the method comprising:
    generating a voltage signal to the data pad from a high impedance state to request a communication session, the voltage signal provided in response to a clock signal received on the data pad during the communication session; and
    detecting a stepped voltage signal having a plurality of successive voltage levels of three voltage levels on a data pad to initiate a data frame of the communication session and control timing of a clock.

7. The method of claim 6 including sampling a data voltage signal having one of two of the three voltage levels received on the data pad as a bit in the data frame after detecting an edge of a clock signal on the data pad.

8. The method of claim 6 including sending a bit on the data pad via remaining at a high impedance state in response to a clock signal received on the data pad.

9. The method of claim 6 including sending a bit on the data pad via a voltage signal corresponding with a reference voltage in response to a clock signal received on the data pad.

10. The method of claim 9 wherein sending the bit on the data pad via a voltage signal corresponding with a reference voltage is in response to detecting a falling edge of the clock signal received on the data pad.

11. A follower circuit, comprising:
    a communication circuit coupled to a single data pad to conduct a communication session with the data pad over a serial interface, the communication circuit of no more than three conductors including the data pad, a reference pad, and a power pad, wherein the communication circuit is configured to
    generate a voltage signal to the data pad to request a communication session, and detect a stepped voltage signal having a plurality of successive voltage levels of three voltage levels on a data pad to initiate a data frame of the communication session and control timing of a clock, the voltage signal provided in response to a clock signal received on the data pad during the communication session; and
    an authentication circuit coupled to the communication circuit to identify a parameter in the data frame.

12. The follower circuit of claim 11 wherein the communication circuit is configured to sample a data voltage signal having one of two of the three voltage levels received on the data pad as a bit in the data frame after detecting an edge of a clock signal on the data pad.

13. The follower circuit of claim 11 wherein the communication circuit sends a bit on the data pad via remaining at a high impedance state in response to a clock signal received on the data pad.

14. The follower circuit of claim 11 wherein the communication circuit sends a bit on the data pad via a voltage signal corresponding with a reference voltage in response to a clock signal received on the data pad.

15. The follower circuit of claim 14 wherein the communication circuit sends the bit on the data pad via a voltage signal corresponding with a reference voltage is in response to detecting a falling edge of the clock signal received on the data pad.

16. The follower circuit of claim 11 wherein the parameter relates to a print substance.

* * * * *